United States Patent
Corrie (10) Patent No.: US 10,152,409 B2
(45) Date of Patent: Dec. 11, 2018

(54) HYBRID IN-HEAP OUT-OF-HEAP BALLOONING FOR JAVA VIRTUAL MACHINES

(75) Inventor: Benjamin J. Corrie, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 1477 days.

(21) Appl. No.: 13/460,565

(22) Filed: Apr. 30, 2012

(65) Prior Publication Data

US 2013/0290596 A1  Oct. 31, 2013

(51) Int. Cl.
G06F 12/02 (2006.01)
G06F 9/50 (2006.01)

(52) U.S. Cl.
CPC .......... G06F 12/023 (2013.01); G06F 9/5022 (2013.01); *G06F 9/5077* (2013.01); *G06F 2212/1016* (2013.01); *G06F 2212/151* (2013.01)

(58) Field of Classification Search
None
See application file for complete search history.

(56) References Cited

U.S. PATENT DOCUMENTS

| | | | |
|---|---|---|---|
| 5,493,663 A | 2/1996 | Parikh | |
| 5,606,685 A | 2/1997 | Frandeen | |
| 6,202,127 B1 | 3/2001 | Dean et al. | |
| 6,496,912 B1 | 12/2002 | Fields, Jr. et al. | |
| 6,789,156 B1 | 9/2004 | Waldspurger | |
| 7,412,492 B1 | 8/2008 | Waldspurger | |
| 7,421,533 B2 | 9/2008 | Zimmer et al. | |
| 7,433,951 B1 | 10/2008 | Waldspurger | |
| 7,472,252 B2 | 12/2008 | Ben-Zvi | |
| 7,500,048 B1 | 3/2009 | Venkitachalam et al. | |
| 7,640,543 B2 | 12/2009 | Vij et al. | |
| 7,702,843 B1 | 4/2010 | Chen et al. | |
| 7,716,446 B1 | 5/2010 | Chen et al. | |
| 7,797,699 B2 | 9/2010 | Kagi et al. | |
| 7,870,153 B2 | 1/2011 | Croft et al. | |
| 7,886,126 B2 | 2/2011 | Bennett et al. | |
| 8,095,931 B1 | 1/2012 | Chen et al. | |
| 8,156,492 B2 | 4/2012 | Dahlstedt | |
| 8,359,451 B2 | 1/2013 | Chen et al. | |

(Continued)

OTHER PUBLICATIONS

Patent Cooperation Treaty, "International Search Report", issued in connection with International Patent Application No. PCT/US2011/042388, dated Aug. 30, 2011 (3 pages).

(Continued)

*Primary Examiner* — Charles Rones
*Assistant Examiner* — Ryan Dare
(74) *Attorney, Agent, or Firm* — Patterson + Sheridan, LLP (57) ABSTRACT

A mechanism is provided for managing memory of a runtime environment executing on a virtual machine. A balloon agent that is part of a runtime environment is configured to coordinate inflations of a memory balloon within a heap of" the runtime environment and an out-of-heap overflow balloon, particularly in situations where a hypervisor needs to reclaim more memory from the runtime environment than the runtime environment is able to give up. The balloon agent may slowly free out-of-heap balloon memory, which may cause an increase of a target size for the balloon agent, which in turn inflates the memory balloon inside the heap of the runtime environment.

20 Claims, 4 Drawing Sheets

(56) References Cited

U.S. PATENT DOCUMENTS

| | | |
|---|---|---|
| 8,543,790 B2 | 9/2013 | Chen et al. |
| 8,583,875 B1 | 11/2013 | Garthwaite et al. |
| 8,949,295 B2 | 2/2015 | McDougall et al. |
| 9,015,203 B2 | 4/2015 | Corrie |
| 2001/0044856 A1 | 11/2001 | Agesen et al. |
| 2002/0019716 A1 | 2/2002 | Agesen et al. |
| 2003/0212719 A1 | 11/2003 | Yasuda et al. |
| 2005/0232192 A1 | 10/2005 | Rawson |
| 2005/0262505 A1 | 11/2005 | Esfahany et al. |
| 2006/0004944 A1 | 1/2006 | Vij et al. |
| 2006/0064697 A1 | 3/2006 | Kagi et al. |
| 2006/0161719 A1 | 7/2006 | Bennett et al. |
| 2007/0038837 A1 | 2/2007 | Ben-Zvi |
| 2007/0136402 A1 | 6/2007 | Grose et al. |
| 2007/0192329 A1 | 8/2007 | Croft et al. |
| 2009/0070776 A1 | 3/2009 | Dahlstedt |
| 2010/0211754 A1 | 8/2010 | Crosby et al. |
| 2010/0241785 A1 | 9/2010 | Chen et al. |
| 2011/0138147 A1 | 6/2011 | Knowles et al. |
| 2011/0320682 A1 | 12/2011 | McDougall et al. |
| 2012/0110577 A1 | 5/2012 | Chen et al. |
| 2012/0185854 A1 | 7/2012 | Dahlstedt |
| 2012/0233435 A1* | 9/2012 | Ben-Yehuda et al. ........ 711/170 |
| 2013/0132957 A1 | 5/2013 | Chen et al. |
| 2013/0218644 A1 | 8/2013 | Kasravi et al. |
| 2013/0290382 A1 | 10/2013 | Adachi et al. |
| 2013/0290596 A1 | 10/2013 | Corrie |
| 2013/0339568 A1 | 12/2013 | Corrie |

OTHER PUBLICATIONS

Patent Cooperation Treaty, "Written Opinion of the International Search Authority," issued in connection with International Patent Application No. PCT/US2011/042388, dated Aug. 30, 2011 (4 pages).

Patent Cooperation Treaty, "International Preliminary Report on Patentability," issued in connection with International Patent Application No. PCT/US2011/042388, dated Jan. 8, 2013 (5 pages).

Heo et al., Memory overbooking and dynamic control of Xen virtual machines consolidated environments, ASPOLOS RESOLVE—Workshop on Runtime Environments/Systems, Layering and Virtualized Environments, 2011.

Schwidefsky et al., Collaborative Memory Management in Hosted Linux Environments:, Proceedings of the Linux Symposium, vol. 2, pp. 313-328,206.

Tauber, "Automation and Optimization in IT-DB Oracle VM virtualization Systems", CERN openlab, Aug. 20, 2010.

C.A. Waldspurger, "Memory Resource Management in VMWare ESX Server" Proceedings of the 5th Symposium on Operating Systems Design and Implementation (OSDI 2002), AMC Operating Systems Review, pp. 181-194, Dec. 2002.

Gordon et al., "Ginko Automated, Application-Driven Memory Overcommitment for Could Computing", ASPOLOS RESOLVE—Workshop on Runtime Environments/Systems, Layering and Virtualized Environments, 2011.

* cited by examiner

HYBRID IN-HEAP OUT-OF-HEAP BALLOONING FOR JAVA VIRTUAL MACHINES

CROSS-REFERENCE TO RELATED APPLICATION(S)

This application is related to the patent application entitled "Elastic Caching for Java Virtual Machines" application Ser. No. 13/460,556 filed Apr. 30, 2012, now U.S. Pat. No. 9,852,054, which is assigned to the assignee of this application and have been filed on the same day as this application.

BACKGROUND

Virtual computing environments allow multiple virtual machines (VMs) to run on a single physical platform (also referred to herein as a "host") and to share physical resources. Some virtual computing environments enable configuration of VMs such that the total amount of memory designated for use by the VMs is larger than the actual amount of memory available on the host. Referred to as memory over-commitment, this feature enables the host to support the simultaneous execution of more VMs. To achieve over-commitment, the virtual computing environment simply gives a VM less memory than what the guest operating system (OS) in the VM believes it has.

Memory over-commitment is traditionally enabled using a technique known as ballooning, which is described in U.S. Pat. No. 7,433,951, the entire contents of which are incorporated by reference herein. A balloon is a resource reservation application that runs as a guest application in the VM or as driver in the guest OS that requests guest physical memory from the guest OS. After the guest OS has allocated guest physical memory for use by the balloon application, the balloon application is able to ultimately communicate information regarding the allocated guest physical memory to a hypervisor that supports the VM, which is then able to repurpose the host's system memory (also referred to herein as "machine memory") backing the guest physical memory allocated to the balloon application. That is, since the balloon application only reserves guest physical memory but does not actually use it, the hypervisor can, for example, repurpose machine memory that backs such allocated guest physical memory for use by another VM without fear that the balloon application would write to the guest physical memory (and therefore the backed machine memory).

Another technique for memory management that is useful under memory over-commitment situations is referred to as page sharing. In this technique, the virtual computing environment identifies and eliminates redundant copies of guest physical memory pages across VMs. The virtual infrastructure maps the identical guest physical pages to the same machine memory page and enables copy-on-write behavior with regards to that machine memory page. This technique enables sharing of memory between VMs in cases where VMs may be running instances of the same guest OS, applications, and libraries, and have other data in common.

Unfortunately, there are applications and runtime environments that do not work well with conventional memory over-commitment in virtual computing environments. Java Virtual Machine (JVM) is one of the most widely used runtime environments in this category. JVMs typically have their own memory management mechanisms. Allocated Java objects sit in a JVM heap until the JVM runs out of heap space, and in this event, garbage collection sweeps the heap and recycles dead objects, which are the objects unreachable from the program. A memory-managed JVM runtime can be a problematic candidate for memory over-commitment because freed memory made available by garbage collection is typically held exclusively for the use of the runtime and therefore cannot be used by other applications running in the operating system or virtualized infrastructure. In this environment, attempts to over-commit the memory may result in lack of memory to support the JVM heap, causing a significant performance hit.

Recent advances in memory-managed JVM runtimes have used a ballooning-type mechanism incorporated into the JVM runtime. To "inflate" the JVM balloon, objects are inserted into heap memory reserved for the JVM runtime and the JVM runtime's own memory management techniques, such as garbage collection, are relied upon to free and clear up available memory space. However, if the JVM runtime is unable to give up enough memory to satisfy memory demands from a hypervisor, such as in scenarios where a Java application is actively using much of the heap memory assigned to the JVM, then the hypervisor has to resort to host swapping of memory pages to disk, thereby incurring a heavy cost in performance and efficiency.

SUMMARY

One or more embodiments of the present disclosure provide methods, systems, and computer programs for managing memory in a host system in which virtual machines (VMs) execute. In one embodiment, a balloon agent that is part of a runtime environment (e.g., JVM) is configured to "grow" the runtime environment according to both memory pressure external to the VMs (e.g., by a hypervisor) and by applications running within the JVM. To inflate the balloon, the balloon agent requests memory pages from a guest operating system of the VM and notifies the hypervisor that memory pages may be page-shared and reclaimed for other uses. When memory pressure from application running within the JVM later decrease, the balloon agent may shift the allocated memory pages for use in-heap. Accordingly, embodiments of the present disclosure describe an out-of-heap memory balloon mechanism that advantageously coordinates runtime environment-level memory pressure and guest OS-level memory pressure to provide flexible memory management virtual machines.

A method for managing memory of a runtime environment executing on a virtual machine, according to one embodiment, includes the steps of receiving, from a virtualization software that supports execution of the virtual machine, a target amount of memory to be reclaimed from the virtual machine, and reclaiming a first portion of the target amount of memory from heap memory of the runtime environment. The heap memory comprises guest physical memory reserved for and managed by the runtime environment. The method further includes determining, by operation of a memory management agent in the runtime environment, a second portion of the target amount of memory to be reclaimed, and identifying at least one guest physical memory page to be allocated as part of the runtime environment but external to the heap memory of the runtime environment. The one or more guest physical memory page may have a size equal to the second portion of the target amount of memory to be reclaimed. The method further includes notifying a hypervisor that at least one machine memory page associated with the identified guest physical memory page can be re-claimed.

Further embodiments of the present invention include, without limitation, a non-transitory computer-readable storage medium that includes instructions that enable a processing unit to implement one or more of the methods set forth above or the functions of the computer system set forth above.

DETAILED DESCRIPTION

Figure 1:
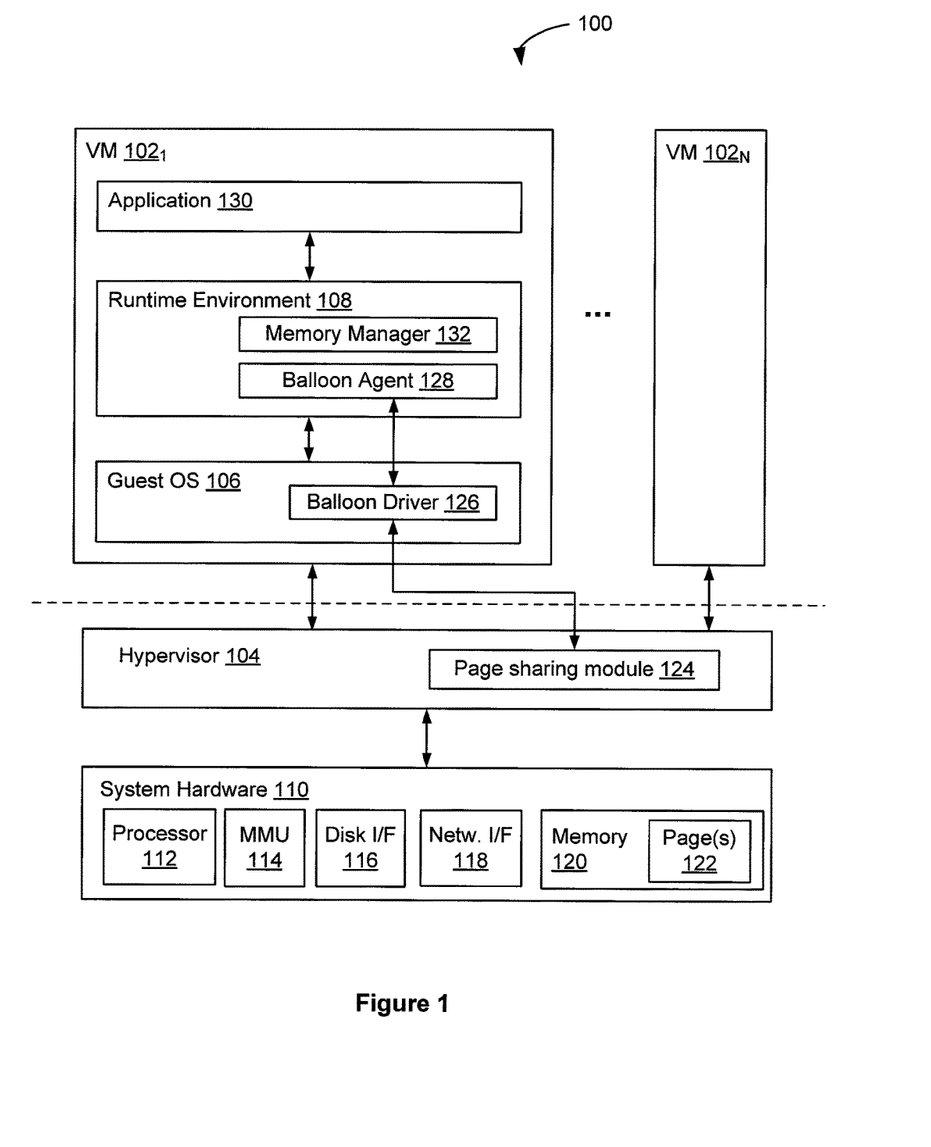
FIG. 1 is a block diagram that illustrates a virtualized computer system with which one or more embodiments of the present invention may be utilized.

FIG. 1 is a block diagram that illustrates a virtualized computer system 100 with which one or more embodiments of the present invention may be utilized. Computer system 100 (also referred to as a "server" or "host") is configured to support a virtualized environment comprised of one or more virtual machines.

As in conventional computer systems, computer system 100 includes both system hardware 110 and system software. System hardware 110 generally includes a processor 112, some form of memory management unit (MMU) 114 (which may be integrated with processor 112), a disk interface 116, a network interface 118, and memory 120 (referred to herein as "machine memory"). Machine memory 120 stores data and software such as an operating system and currently running application programs. Generally, MMU 114 is responsible for managing a virtual memory for processes running in computer system 100 by mapping virtual memory pages to machine memory pages. MMU 114 typically divides virtual memory address space and machine memory address space into blocks of contiguous memory addresses referred to as memory pages 122. Processor 112 may be a single processor, or two or more cooperating processors in a known multiprocessor arrangement. Examples of disk interface 116 are a host bus adapter and a network file system interface. An example of network interface 118 is a network adapter, also referred to as a network interface controller (NIC). In some embodiments, a plurality of NICs is included as network interface 118. It should further be recognized that system hardware 110 also includes, or is connected to, conventional registers, interrupt handling circuitry, a clock, etc., which, for the sake of simplicity, are not shown in the figures.

One or more virtual machines (VMs), represented by VM $102_1$ to VM $102_N$, are configured within computer system 100 and share the hardware resources of computer system 100. Each virtual machine typically includes a guest operating system (OS) 106 and virtualized system hardware (not shown), which includes one or more virtual CPUs, virtual system memory, one or more virtual disks, one or more virtual devices, etc., all of which are implemented in software to emulate the corresponding components of an actual computer.

The virtual machines run on top of a hypervisor 104 (sometimes referred to as a virtual machine monitor, or VMM), which is a software interface layer that abstracts system hardware 110 into virtualized hardware, thereby enabling sharing of system hardware 110 of computer system 100 amongst the virtual machines. Hypervisor 104 acts as an interface between VM $102_1$ and system hardware 110 for executing VM-related instructions and for transferring data to and from machine memory 120, processor(s) 112, disk interface 116, etc. Hypervisor 104 may run on top of an operating system of computer system 100 or directly on hardware components of computer system 100.

In one embodiment, hypervisor 104 includes a page sharing module 124 configured to perform a page sharing process, according to one embodiment, on guest physical memory pages utilized by VM $102_1$. Page sharing module 124 is configured to re-map guest physical memory pages assigned to VM $102_1$ and runtime environments 108 having the same contents to a same machine memory page 122. For clarity of discussion, the term machine memory refers to actual hardware memory that is visible to hypervisor 104. The term guest physical memory refers to a software abstraction used to provide the illusion of hardware memory to a VM. Guest physical memory is generally visible to a guest OS running on a VM. Guest physical memory is backed by machine memory and hypervisor 104 provides a mapping from guest physical memory to machine memory. The term guest virtual memory refers to a continuous virtual address space presented by a guest OS to applications running inside a VM.

Page sharing module 124 is configured to map one or more hinted guest physical memory page with a matched guest physical memory page to a same machine memory page 122. Page sharing module 124 may modify one or more internal references in a page table to associate the hinted guest physical memory page with the matched memory page such that only one copy of the memory page needs be retained within machine memory 120. That is, only one copy of the data region within heap memory needs to be retained within machine memory 120. It is noted that if a later access attempts to modify the shared machine memory page 122 (e.g., later cache data) hypervisor 104 immediately makes a copy of the shared memory as per a copy-on-write (COW) technique. Hypervisor 104 reclaims a machine memory page 122 previously utilized by the hinted guest physical memory page assigned to runtime environment 108 and makes the de-allocated machine memory page available to other processes executing on host computer system 100, such as other VMs and/or other runtime environments 108.

VM $102_1$ is configured to support a runtime environment 108 running on top of guest OS 106. To simplify the description, description of other VMs $102_N$ are omitted but it should be understood that VMs $102_N$ are configured similarly to VM $102_1$. Runtime environment 108 includes a memory manager 132 that requests memory from guest OS 106, which has its own methods for managing memory use over time. In the embodiments illustrated herein, runtime environment 108 is a Java Virtual Machine (JVM), although it should be recognized that other runtime environments and/or applications executing on top of the guest OS and having their own memory manager, such as databases, web servers, etc., may be used without departing from the scope of the teachings herein. The embodiments presented should therefore not be interpreted to be exclusive or limiting, but rather exemplary or illustrative.

Runtime environment 108 supports execution of one or more applications (e.g., application 130) that provide, for example, web services, database services, and other information technology services that may involve retrieval, processing, and serving of data to one or more users. Memory used by and during execution of application 130 is handled by memory manager 132, which may allocate memory from a portion of guest physical memory specifically reserved for runtime environment 108, referred to as heap memory.

Runtime environment 108 of VM $102_1$ is configured to coordinate with hypervisor 104 to manage memory using a mechanism for balloon memory that performs page sharing procedures on guest physical memory pages utilized by runtime environment 108. According to an embodiment, VM $102_1$ includes a balloon driver 126 installed in guest OS 106 and a balloon agent 128 within runtime environment 108. Balloon driver 126 is a systems-level driver configured to communicate with hypervisor 104 and balloon agent 128 to exert memory pressure on runtime environment 108. It should be recognized that memory ballooning at the level of guest OS 106 by balloon driver 126 is often disabled when using a balloon agent 128 within runtime environment 108 because the opaque nature of runtime environment 108 and its memory manager 132 generally precludes using both techniques at the same time. For example, one reason for not having balloon driver 126 inflate in addition to balloon agent 128 in runtime environment 108 is that heap size of runtime environment 108 may grow over time and whether or not out-of-heap ballooning is going to be beneficial or more efficient may be decided based on whether the heap has fully grown. If the heap has not fully grown, it may not be efficient for JVM ballooning to force arbitrary heap growth if the memory can be reclaimed from outside the heap instead. Accordingly, it has been determined that a balance between in-heap and out-of-heap ballooning should be determined by balloon agent 128, which has knowledge of the state of runtime environment 108. As such, when balloon driver 126 receives instructions from hypervisor 104 to inflate, balloon driver 126 in turn requests balloon agent 128 to inflate, rather than requesting for memory pages directly from guest OS 106.

Balloon agent 128 is a thread or process executing within runtime environment 108 configured to exert memory pressure on the heap memory of runtime environment 108. Responsive to commands and/or signals provided by hypervisor 104 via balloon driver 126, balloon agent 128 inflates a memory balloon by allocating objects within heap memory to effectively reduce the heap space that can be used by runtime environment 108 and any applications 130 running therein. The allocated objects may be given a predetermined value, such as zeroed data, that may be page shared using page sharing module 124. The shared memory pages may be reclaimed by hypervisor 104 and used for other processes, threads, applications, virtual machines, etc. One example of a balloon agent and its operations is further described in more detail in U.S. patent application Ser. No. 12/826,389, filed Jun. 29, 2010, and entitled "Cooperative Memory Resource Management via Application-Level Balloon," which is incorporated herein by reference.

Figure 2:
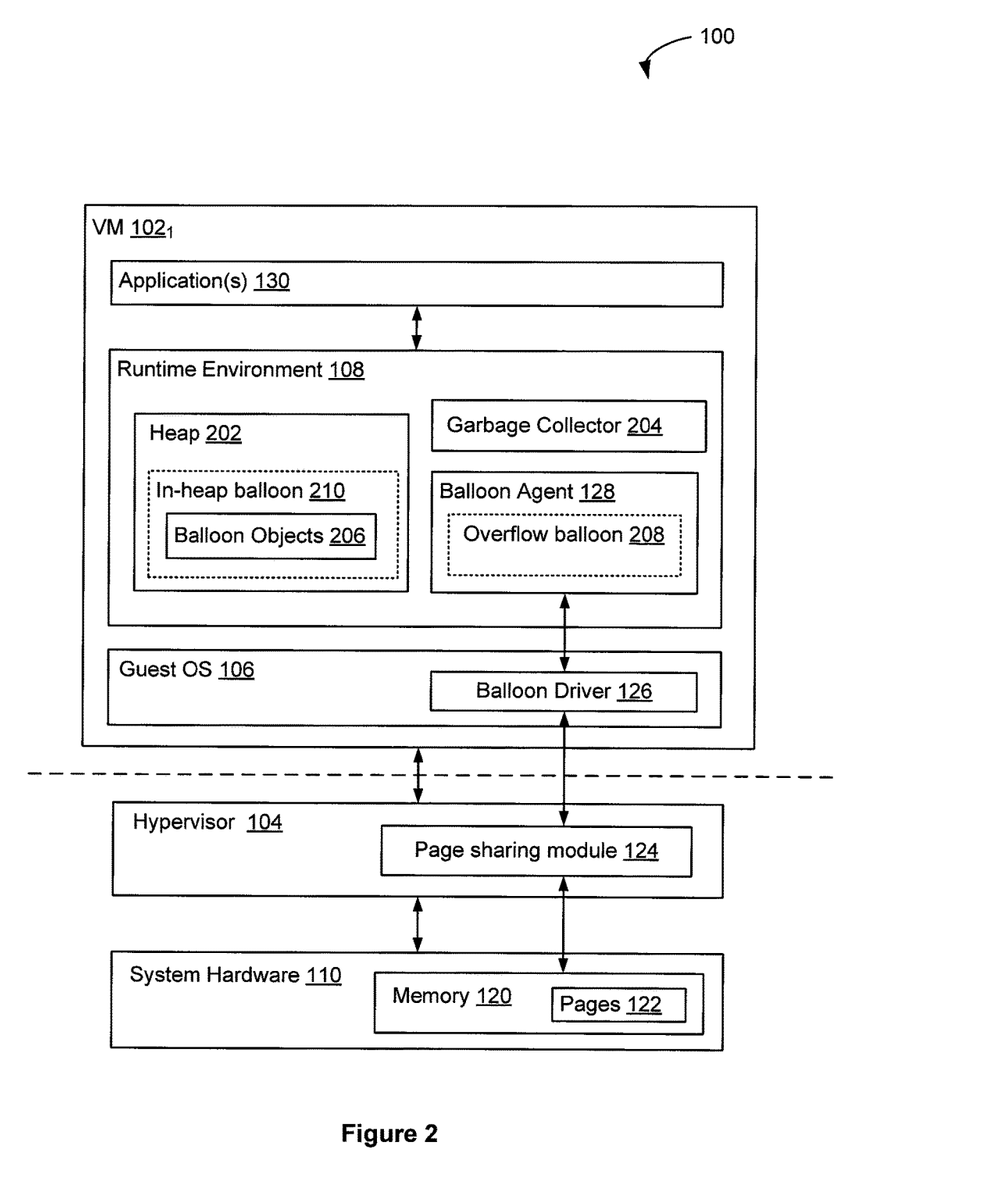
FIG. 2 illustrates, in greater detail, the virtualized computer system of FIG. 1 configured to perform memory management techniques while executing a runtime environment, according to one or more embodiments.

FIG. 2 illustrates, in greater detail, a VM $102_1$ configured to perform memory management techniques, according to one or more embodiments, while executing runtime environment 108. Runtime environment 108 includes a heap 202 and a garbage collector 204 to support execution of one or more applications 130 within runtime environment 108. Garbage collector 204 is a memory manager for runtime environment that attempts to reclaim heap memory occupied by objects in heap 202 no longer used by runtime environment 108 or applications 130 running therein. Heap 202 comprises a region of memory (referred to herein as "heap memory") reserved for storing one or more objects (e.g., Java objects) and other data structures utilized during execution of application 130. When heap 202 runs out of space, garbage collector 204 may initiate a garbage collection process wherein live objects are compacted and dead objects are cleared to create free space.

According to one memory management technique described herein, balloon agent 128 is configured to "inflate" an in-heap balloon 210 within heap 202 by allocating one or more balloon objects 206 to take up space within heap 202. Balloon agent 128 creates and tracks balloon objects 206 within heap 202. In some embodiments, balloon agent 128 determines a page address of one or more guest physical memory pages that balloon objects 206 span. Page sharing module 124 uses the page addresses of the one or more guest physical memory pages storing balloon objects 206 to reclaim some amount of guest physical memory pages. In some embodiments, balloon objects 206 are configured as "soft-referenced" or "weak-referenced". A weak-referenced object is an object that shall be garbage collected by garbage collector 204 even though the weak-referenced object may still be a live object. A soft-referenced object is an object that may be garbage collected at the discretion of garbage collector 204 in response to memory demands. In some embodiments, some or all of balloon objects 206 may be "soft-referenced" or "weak-referenced" to allow for a more flexible memory balloon. For example, initiation of a garbage collection process suggests that available heap memory is in short supply. As such, it may be desirable to defer to the runtime environment's internal memory manager 132 and permit garbage collection to delete one or more balloon objects 206. Any deleted balloon objects 206 may be re-created after garbage collection, using reclaimed heap memory made available by garbage collection after cleaning away dead objects.

Figure 3:
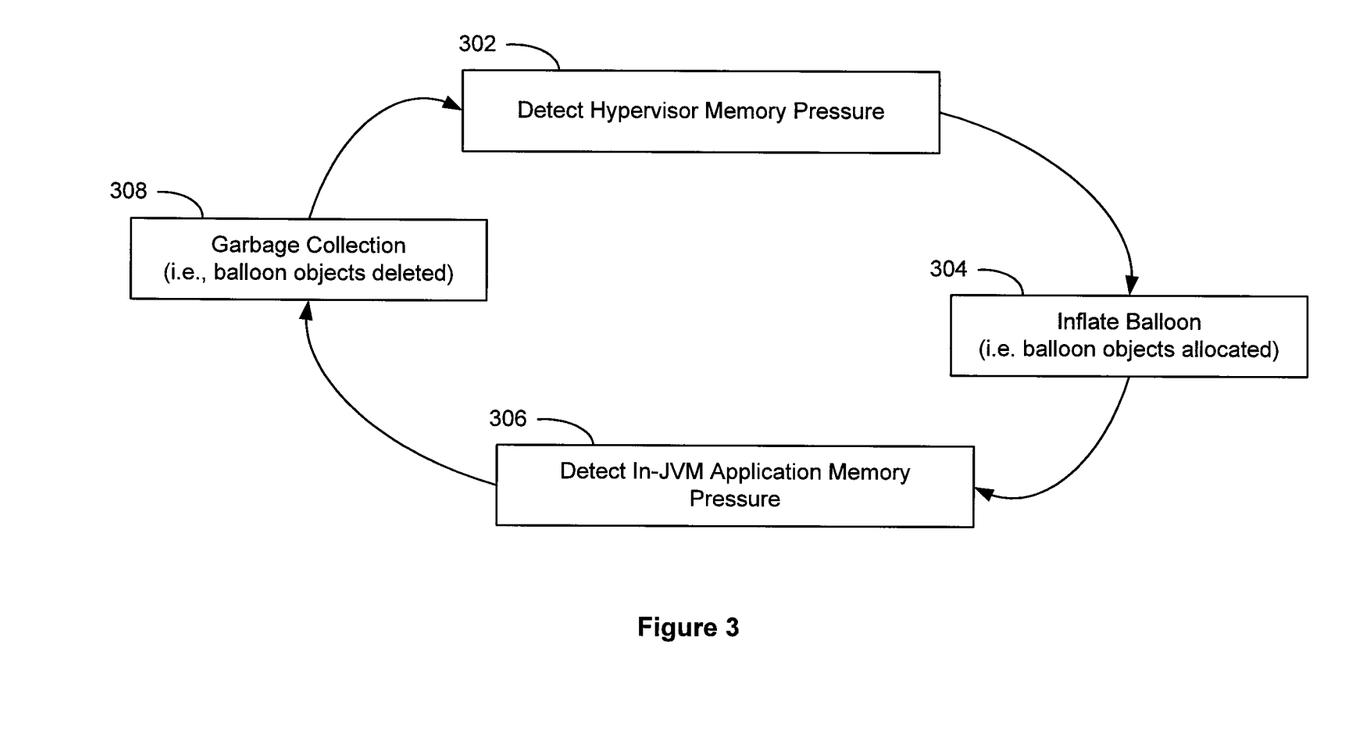
FIG. 3 is a flow diagram that illustrates a feedback loop that may occur while managing memory assigned to a runtime environment.

Memory demands by applications 130 running within runtime environment 108 may present certain issues related to managing memory using a memory balloon technique described above. FIG. 3 illustrates a cycle of events that may occur while managing memory of a runtime environment 108 having an active application 130 executing therein. At 302, balloon agent 128 may detect memory pressure from outside of runtime environment 108, such as from hypervisor 104. Responsive to the memory pressure, at 304, balloon agent 128 initiates an operation to inflate a memory balloon 210 within heap 202 of runtime environment 108. For example, balloon agent 128 may create one or more balloon objects 206 in heap 202, thereby allowing a portion of heap 202 to be page shared (e.g., by page sharing module 124) to satisfy memory pressure from hypervisor 104.

In cases where an application 130 uses only a small portion of heap memory during its execution, inflation of a memory balloon 210 within heap 202 is likely to yield a substantial amount of guest physical memory pages to be repurposed by hypervisor 104. However, in some situations, such as during heavy workloads, application 130 may be using a significant portion of heap memory, thereby exerting application memory pressure within runtime environment 108, at 306. The memory profile of application 130 within heap 202 may compete with any balloon objects 206 created to inflate memory balloon 210. That is, the combination of active memory used by application 130 and any balloon objects 206 created while inflating memory balloon 210 may use up all or nearly all of available heap memory 202.

At 308, garbage collector 204 detects depletion of available heap memory and initiates a garbage collection process.

Garbage collector 204 may delete one or more balloon objects 206 that are configured as weak-referenced objects (or soft-referenced objects) to make memory available within heap 202. Nonetheless, memory pressure external to VM 102 (e.g., from hypervisor 104) persists, which may cause in-heap balloon 210 to continually re-inflate. As such, a cycle of memory pressure may arise wherein balloon objects 206 are created in heap 202 but are quickly removed or deleted by garbage collection without providing any benefit or memory relief. Further, if hypervisor 104 continues to be unable to reclaim more guest physical memory from runtime environment 108 than runtime environment 108 is able to give up (e.g., via balloon agent 128), hypervisor 104 may resort to host swapping. Host swapping is a technique where one or more machine memory pages are copied to secondary storage (e.g., disk) and incurs a high cost in time and performance.

Accordingly, embodiments of the present disclosure provide an "out-of-heap" mechanism that grows the memory profile of runtime environment 108 to reclaim memory within VM $102_1$, thereby avoiding expensive host swapping. Referring back to FIG. 2, balloon agent 128 is configured to request memory pages from guest OS 106 to "inflate" an overflow balloon 208 responsive to high memory pressure from both applications 130 and hypervisor 104. Because balloon agent 128 is a thread or process deemed a part of runtime environment 108, an inflated overflow balloon 208 increases the overall memory profile of runtime environment 108, which, in turn, puts increased memory pressure on guest OS 106. The increased memory profile of runtime environment 108 may be tolerated by guest OS 106 because guest OS 106 may be able to reclaim guest physical memory from other applications running on top of guest OS 106.

Figure 4:
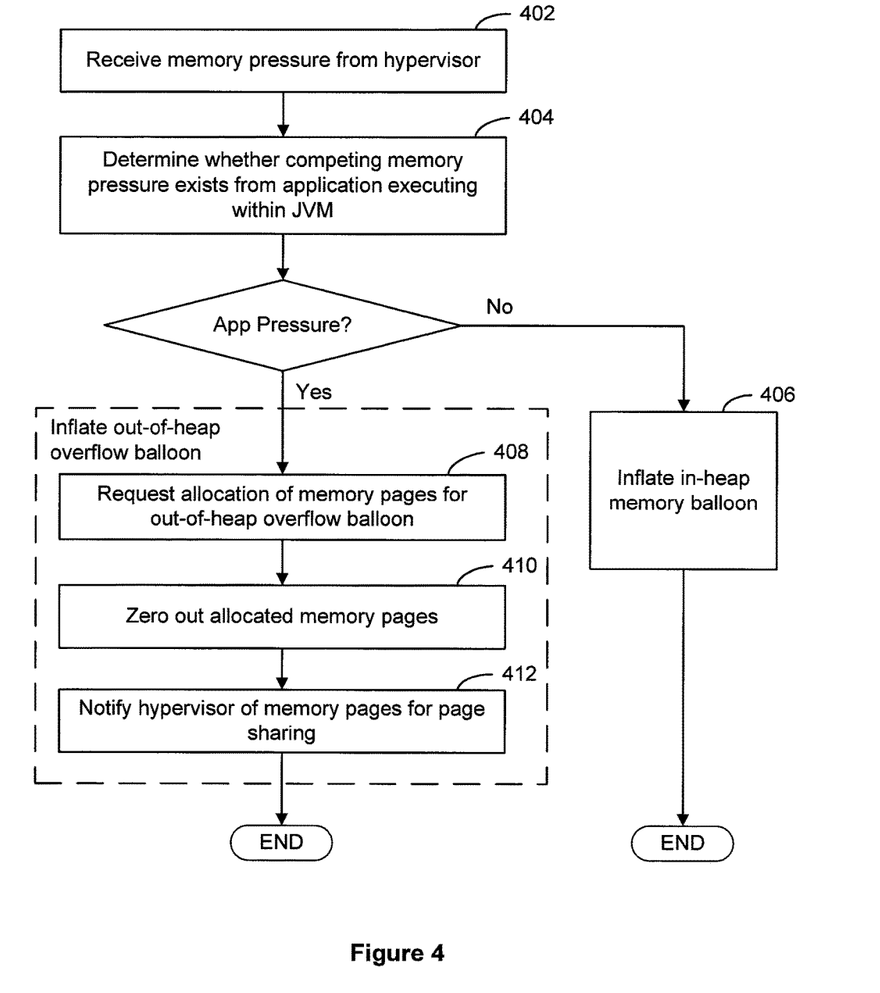
FIG. 4 is a flow diagram that illustrates steps for a method of managing memory assigned to a runtime environment, according to an embodiment of the present invention.

FIG. 4 is a flow diagram that illustrates steps for a method of managing memory assigned to a runtime environment 108, according to an embodiment of the present disclosure. It should be recognized that, even though the method is described in conjunction with the systems of FIG. 1 and FIG. 2, any system configured to perform the method steps is within the scope of embodiments of the invention.

In step 402, balloon agent 128 receives an indication of memory pressure from hypervisor 104. In some embodiments, balloon agent 128 may periodically poll for a target balloon size from balloon driver 126 and determine whether the new target size for memory balloon is greater than or less than a current size of memory balloon. In some embodiments, balloon agent 128 may communicate directly with hypervisor 104 to periodically poll for a target balloon size. In another embodiment, the communication between balloon agent 128 and balloon driver 126 within guest OS 106 is through standard POSIX system calls.

In step 404, balloon agent 128 determines whether competing memory pressure exists from an application (e.g., application 130) executing within runtime environment 108. Balloon agent 128 may determine whether competing memory pressure exists based on a proportion of live objects to dead objects in heap 202. In some embodiments, balloon agent 128 may monitor the amount of memory reclaimed by garbage collector 204 during each garbage collection. If little memory is being given up by runtime environment 108, balloon agent 128 may infer a state of high application memory usage. In some embodiments, balloon agent 128 may monitor the balloon objects 206 and infer a state of high application memory usage based on a rate of turnover in balloon objects 206 (i.e., balloon objects are deleted by garbage collection soon after the balloon objects are created).

In step 406, responsive to determining a state of low application memory pressure, balloon agent 128 may simply revert to inflating an in-heap memory balloon 210 by allocating one or more balloon objects 206 within heap 202, as described above and in further detail in U.S. patent application Ser. No. 12/826,389. In some embodiments, responsive to receive a target balloon size, balloon agent 128 may attempt to inflate an in-heap memory balloon 210 (e.g., regardless of competing memory use from application 130) and how heap 202 behaves in response to the inflated in-heap memory balloon 210. For example, balloon agent 128 may determine, according to results of an initial attempt to inflate an in-heap memory balloon 210, that out-of-heap ballooning may be a more efficient mechanism to satisfy the target balloon size.

In step 408, responsive to determining a state of high memory pressure from applications executing within runtime environment 108, balloon agent 128 requests allocation of one or more guest physical memory pages for out-of-heap overflow balloon 208. In some embodiments, balloon agent 128 requests a number of guest physical memory pages having a size sufficient to satisfy memory demands from hypervisor 104. In some embodiments, balloon agent 128 obtains physical page numbers (PPNs) of the guest physical memory pages allocated for overflow balloon 208. Balloon agent 128 pins the PPNs in guest memory (e.g., using get_user_pages in Linux) to instruct guest OS 106 that the allocated guest physical memory pages may not be paged out.

In step 410, balloon agent 128 sets the allocated guest physical memory pages to a pre-determined value that facilitates page-sharing by page sharing module 124. In some embodiments, balloon agent 128 zeros out the allocated guest physical memory pages.

In step 412, balloon agent 128 coordinates with balloon driver 126 and hypervisor 104 to utilize page sharing techniques on the guest physical memory pages allocated for overflow balloon 208. In some embodiments, balloon agent 128 notifies, or "hints," to hypervisor 104 that guest physical memory pages assigned to overflow balloon 208 are candidates for page sharing. In one implementation, balloon agent 128 may communicate with hypervisor 104 via a backdoor call and provides a page sharing hint comprising an address of a candidate guest physical memory page (e.g., a guest physical page number.)

In some embodiments, balloon agent 128 may later deflate overflow balloon 208 responsive to a decrease in memory competition in heap 202 as determined by balloon agent 128. To deflate, balloon agent 128 frees one or more guest physical memory pages and returns the memory pages to guest OS 106. In other embodiments, balloon agent 128 may free portions of overflow balloon 208 upon expiry of a timer that limits the duration of the overflow balloon inflation. It should be recognized that after balloon agent 128 has freed some or all of overflow balloon 208, hypervisor 104 may increase the target balloon size for VM $102_1$. Balloon agent 128 may respond to this increased target balloon size by inflating in-heap balloon 210. Accordingly, balloon agent 128 may, in effect, deflate overflow balloon 208 and "shift" reclaimed guest physical memory pages back into heap 202 by inflating in-heap balloon 210. It should be recognized that hypervisor 104 may well determine that once guest physical memory assigned to overflow balloon 208 (e.g., out-of-heap memory) has been freed, that there is no need to expand target balloon size to compensate.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. For example, runtime environment 108 may generally utilize guest virtual memory pages rather than guest physical memory pages and the backdoor call mechanisms (e.g., hypervisor-aware drivers within guest OS 106, etc.) utilized by runtime environment 108 to communicate with hypervisor 104 that may translate guest virtual memory page references received from runtime environment 108 to guest physical memory page references prior to providing them to hypervisor 104. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing memory of a runtime environment executing in a virtual machine, the method comprising:
   receiving, from a virtualization software that supports execution of the virtual machine, a target amount of memory to be reclaimed from the virtual machine;
   reclaiming a first portion of the target amount of memory from heap memory of the runtime environment, wherein the heap memory comprises guest physical memory reserved for and managed by the runtime environment;
   determining, by operation of a memory management agent in the runtime environment, a second portion of the target amount of memory to be reclaimed;
   identifying at least one guest physical memory page to be allocated as part of the runtime environment but external to the heap memory of the runtime environment, the one or more guest physical memory page having a size equal to the second portion of the target amount of memory to be reclaimed; and
   notifying a hypervisor that at least one machine memory page associated with the identified guest physical memory page can be re-claimed.

2. The method of claim 1, wherein the step of determining the second portion of the target amount of memory is performed responsive to determining a state of competing memory pressure from an application executing within the runtime environment, wherein the application uses the heap memory.

3. The method of claim 1, wherein the step of determining the second portion of the target amount of memory is performed responsive to determining that an amount of reclaimable heap memory is less than the target amount of memory to be reclaimed.

4. The method of claim 3, wherein the step of determining further comprises:
   determining an estimate of the amount of reclaimable heap memory according to an amount of dead objects collected by a previous garbage collection.

5. The method of claim 3, wherein the reclaiming the first portion of the target amount of memory from heap memory further comprises:
   allocating one or more balloon objects within the heap memory; and
   determining the amount of reclaimable heap memory according to a turnover rate of the one or more balloon objects within the heap memory.

6. The method of claim 1, further comprising:
   determining that the amount of reclaimable heap memory is equal to or greater than the target amount of memory to be reclaimed at a time subsequent to identifying the at least one guest physical memory page; and
   de-allocating at least one of the identified guest physical memory pages that are part of the runtime environment but external to the heap memory of the runtime environment.

7. The method of claim 1, further comprising:
zeroing out the at least one identified guest physical memory page that is part of the runtime environment but external to the heap memory of the runtime environment; and
notifying the hypervisor that at least one machine memory page associated with the zeroed out guest physical memory page can be page-shared.

8. A non-transitory computer-readable storage medium comprising instructions that, when executed in a computing device, manage memory of a runtime environment executing in a virtual machine, by performing the steps of:
receiving, from a virtualization software that supports execution of the virtual machine, a target amount of memory to be reclaimed from the virtual machine;
reclaiming a first portion of the target amount of memory from heap memory of the runtime environment, wherein the heap memory comprises guest physical memory reserved for and managed by the runtime environment;
determining, by operation of a memory management agent in the runtime environment, a second portion of the target amount of memory to be reclaimed;
identifying at least one guest physical memory page to be allocated as part of the runtime environment but external to the heap memory of the runtime environment, the one or more guest physical memory page having a size equal to the second portion of the target amount of memory to be reclaimed; and
notifying a hypervisor that at least one machine memory page associated with the identified guest physical memory page can be re-claimed.

9. The non-transitory computer-readable storage medium of claim 8, wherein the instructions for determining the second portion of the target amount of memory are executed responsive to instructions for determining a state of competing memory pressure from an application executing within the runtime environment, wherein the application uses the heap memory.

10. The non-transitory computer-readable storage medium of claim 8, wherein the instructions for determining the second portion of the target amount of memory are executed responsive to instructions for determining that an amount of reclaimable heap memory is less than the target amount of memory to be reclaimed.

11. The non-transitory computer-readable storage medium of claim 10, wherein the instructions for determining further comprises instructions for:
determining an estimate of the amount of reclaimable heap memory according to an amount of dead objects collected by a previous garbage collection.

12. The non-transitory computer-readable storage medium of claim 8, further comprising instructions for:
allocating one or more balloon objects within the heap memory; and
determining the amount of reclaimable heap memory according to a turnover rate of the one or more balloon objects within the heap memory.

13. The non-transitory computer-readable storage medium of claim 8, further comprising instructions for:
determining that the amount of reclaimable heap memory is equal to or greater than the target amount of memory to be reclaimed at a time subsequent to identifying the at least one guest physical memory page; and
de-allocating at least one of the identified guest physical memory pages that are part of the runtime environment but external to the heap memory of the runtime environment.

14. The non-transitory computer-readable storage medium of claim 8, further comprising instructions for:
zeroing out the at least one identified guest physical memory page that is part of the runtime environment but external to the heap memory of the runtime environment; and
notifying the hypervisor that at least one machine memory page associated with the zeroed out guest physical memory page can be page-shared.

15. A computer system for managing memory of a runtime environment executing in a virtual machine, the computer system comprising
a system memory comprising a plurality of machine memory pages; and
a processor programmed to carry out the steps of:
receiving, from a virtualization software that supports execution of the virtual machine, a target amount of memory to be reclaimed from the virtual machine;
reclaiming a first portion of the target amount of memory from heap memory of the runtime environment, wherein the heap memory comprises guest physical memory reserved for and managed by the runtime environment;
determining, by operation of a memory management agent in the runtime environment, a second portion of the target amount of memory to be reclaimed;
identifying at least one guest physical memory page to be allocated as part of the runtime environment but external to the heap memory of the runtime environment, the one or more guest physical memory page having a size equal to the second portion of the target amount of memory to be reclaimed; and
notifying a hypervisor that at least one machine memory page associated with the identified guest physical memory page can be re-claimed.

16. The computer system of claim 15, wherein the processor is further programmed to carry out the step of determining a state of competing memory pressure from an application executing within the runtime environment, wherein the application uses the heap memory.

17. The computer system of claim 15, wherein the processor is further programmed to carry out the step of determining that an amount of reclaimable heap memory is less than the target amount of memory to be reclaimed.

18. The computer system of claim 17, wherein the processor is further programmed to carry out the step of:
determining an estimate of the amount of reclaimable heap memory according to an amount of dead objects collected by a previous garbage collection.

19. The computer system of claim 17, wherein the processor is further programmed to carry out the step of:
allocating one or more balloon objects within the heap memory; and
determining the amount of reclaimable heap memory according to a turnover rate of the one or more balloon objects within the heap memory.

20. The computer system of claim 15, wherein the processor is further programmed to carry out the step of:
zeroing out the at least one identified guest physical memory page that is part of the runtime environment but external to the heap memory of the runtime environment; and notifying the hypervisor that at least one machine memory page associated with the zeroed out guest physical memory page can be page-shared.

* * * * *